(12) United States Patent
Petersen (10) Patent No.: US 7,426,628 B2
(45) Date of Patent: Sep. 16, 2008

(54) RUN-TIME NODE PREFETCH PREDICTION IN DATAFLOW GRAPHS

(75) Inventor: Newton G. Petersen, Austin, TX (US)

(73) Assignee: National Instruments Corporation, Austin, TX (US)

( * ) Notice: Subject to any disclaimer, the term of this patent is extended or adjusted under 35 U.S.C. 154(b) by 877 days.

(21) Appl. No.: 10/800,829

(22) Filed: Mar. 15, 2004

(65) Prior Publication Data

US 2004/0181387 A1    Sep. 16, 2004

Related U.S. Application Data

(60) Provisional application No. 60/454,771, filed on Mar. 14, 2003.

(51) Int. Cl.
*G06F 9/00* (2006.01)
(52) U.S. Cl. .......................................... 712/18; 712/240
(58) Field of Classification Search .................... 712/18, 712/25, 233, 234, 237, 238, 239, 240, 242
See application file for complete search history.

(56) References Cited

U.S. PATENT DOCUMENTS

| 5,265,213 | A | * | 11/1993 | Weiser et al. ................ 712/240 |
| 5,903,750 | A | | 5/1999 | Yeh et al. |
| 6,247,121 | B1 | | 6/2001 | Akkary et al. |
| 6,282,639 | B1 | | 8/2001 | Puziol et al. |
| 6,289,444 | B1 | | 9/2001 | Nair |

OTHER PUBLICATIONS

Thomas et al., "Using Dataflow Based Context for Accurate Value Prediction," IEEE, 2001, pp. 107-117.*
Hennessy and Patterson, "Computer Architecture—A Quantitative Approach, 2nd Edition," 1996, p. 711.*
Tarek Abdelzaher, Ella M. Atkins and Kang G. Shin; "QoS Negotiation in Real-Time Systems and Its Application to Automated Flight Control"; IEEE Transactions on Computers; Nov. 2000; pp. 1170-1183.
Hugo A. Andrade and Scott Kovner; "Software Synthesis from Dataflow Models for G and LabVIEW"; Thirty-Second Asilomar Conference on Signals, Systems & Computers; Nov. 1998; pp. 1705-1709.
Joseph Tobin Buck; "Scheduling dynamic dataflow graphs with Bounded Memory Using the Token Flow Model"; PhD Thesis, University of California at Berkeley; 1993; http://ptolemy.eecs.berkeley.edu/papers/jbuckThesis.

(Continued)

*Primary Examiner*—David J Huisman
(74) *Attorney, Agent, or Firm*—Meyertons Hood Kivlin Kowert & Goetzel, P.C.; Jeffrey C. Hood; Martin R. Wojcik (57) ABSTRACT

A method for run-time prediction of a next caller of a shared functional unit, wherein the shared functional unit is operable to be called by two or more callers out of a plurality of callers. The shared functional unit and the plurality of callers are operable to execute in parallel on a parallel execution unit. The run-time prediction is used for data flow programs. The run-time prediction detects a calling pattern of the plurality of callers of the shared functional unit and predicts the next caller out of the plurality of callers of the shared functional unit. The run-time prediction then loads state information associated with the next caller out of the plurality of callers.

41 Claims, 5 Drawing Sheets

OTHER PUBLICATIONS

Giorgio Buttazzo and Luca Abeni; "Adaptive Rate Control through Elastic Scheduling"; IEEE Conference on Decision and Control; Dec. 2000; pp. 4883-4888.

Brendon Cahoon and Kathryn S. McKinley; "Data Flow Analysis for Software Prefetching Linked Data Structures in Java"; International Conference on Parallel Architectures and Compilation Techniques; 2001; pp. 280-291.

Po-Yung Chang, Eric Hao and Yale N. Patt; "Target Prediction for Indirect Jumps" 24th Annual International Symposium on Computer Architecture; 1997; pp. 274-283.

Marius Evers, Sanjay J. Patel, Robert S. Chappell and Yale N. Patt; "An Analysis of Correlation and Predictability: What Makes Two Level Branch Predictors Work"; 25th Annual International Symposium on Computer Architecture; 1998; pp. 52-61.

Edward A. Lee and Thomas M. Parks; "Dataflow Process Networks"; in Proceedings of the IEEE; Mar. 27, 1995; pp. 773-801.

Zhong Wang, Timothy W. O'Neil, and Edwin Hsing-Mean Sha, "Optimal Loop Scheduling for Hiding Memory Latency Based on Two-Level Partitioning and Prefetching" IEEE Transactions on Signal Processing; Nov. 2001; pp. 2853-2864.

Tse-Yu Yeh and Yale N. Patt; "Alternative Implementations of Two-Level Adaptive Branch Prediction"; 19th Annual International Symposium on Computer Architecture; 1992; pp. 124-134.

T.-Y. Yeh and Y. N. Patt; "Two-level adaptive training branch prediction"; Proceedings of the 24th Annual ACM/IEEE International Symposium on Microarchitecture; 1991; pp. 51-61.

Newton G. Petersen and Martin R. Wojcik; "Feasibility Analysis of Caller Prediction"; Mar. 21, 2002; 4 pages; The Department of Electrical and Computer Engineering—The University of Texas at Austin.

Newton G. Petersen and Martin R. Wojcik; "Node Prefetch Prediction in Dataflow Graphs—Literature Survey"; Mar. 25, 2002; 9 pages; The Department of Electrical and Computer Engineering—The University of Texas at Austin.

Newton G. Petersen and Martin R. Wojcik; "Node Prefetch Prediction in Dataflow Graphs—Final Presentation" Apr. 29, 2002; 9 pages; The Department of Electrical and Computer Engineering—The University of Texas at Austin.

Newton G. Petersen and Martin R. Wojcik; "Node Prefetch Prediction in Dataflow Graphs—Final Report"; May 8, 2002; The Department of Electrical and Computer Engineering—The University of Texas at Austin.

Kurt Keutzer; "Lecture 9: Digital Signal Processors: Applications and Architectures"; Computer Science 252, Spring 2000.

David B. Skillicorn and Domenico Talia; "Models and Languages for Parallel Computation"; ACM Computing Surveys; Oct. 1996; 55 pages; vol. 30, No. 2.

Zhong Wang, Michael Kirkpatrick and Edwing Hsing-Mean Sha; "Optimal Two Level Partitioning and Loop Scheduling for Hiding Memory Latency for DSP Applications"; Design Automation Conference; 2000; 5 pages.

Piet Wauters, Marc Engels, Rudy Lauwereins and J.A. Peperstraete; "Cyclo-Dynamic Dataflow"; 4th EUROMICRO Workshop on Parallel and Distributed Processing; Jan. 1996; pp. 319-326.

Stephen Edwards, Luciano Lavagno, Edward A. Lee and Alberto Sangiovanni-Vincentelli; "Design of Embeded System: Formal Models, Validation, and Synthesis"; Proceedings of the IEEE; Mar. 1997; pp. 366-387; vol. 85, Iss. 3.

Newton G. Petersen and Martin R. Wojcik; "Node Prefetch Prediction in Dataflow Graphs"; IEEE Workshop on Signal Processing Systems; Oct. 2004; pp. 310-315.

Gilles Kahn and David B. MacQueen; "Coroutines and Networks of Parallel Processes"; Information Processing 77—Proceedings of IFIP Congress 77; Toronto, Canada; Aug. 8-12, 1977; pp. 993-998.

* cited by examiner

| 20 | 31 | 6 | 20 | 20 | 31 | 6 | 20 | 11 | 6 | 20 | =191 cycles |
|----|----|---|----|----|----|---|----|----|---|----|-------------|
| A  | F1 |   | C  | A  | F1 |   | C  |    |   |    | Loop 1      |
|    | B1 |   |    |    | B1 |   |    | B2 |   |    | FIR Exec    |
|    |    |   | D  |    |    |   | F2 | F2 |   | E  | Loop 2      |

Fig. 10

| 31 | 6 | 20 | 20 | 6 | 31 | 6 | 20 | =140 cycles |
|----|---|----|----|---|----|---|----|-------------|
| A  |   | C  | A  |   | C  |   |    | Loop 1      |
| F1 | B1|    | F1 | B1| F2 | B2| F1 | FIR Exec    |
|    |   | D  |    |   |    |   | E  | Loop 2      |

Fig. 11

fn.
RUN-TIME NODE PREFETCH PREDICTION IN DATAFLOW GRAPHS

PRIORITY CLAIM

This application claims benefit of priority of U.S. provisional application Ser. No. 60/454,771 titled "Node Prefetch Prediction in Dataflow Graphs" filed Mar. 14, 2003, whose inventor is Newton G. Petersen.

FIELD OF THE INVENTION

The present invention relates to optimizing execution of dataflow programs, and particularly to run-time prediction and prefetching of state information for nodes in a dataflow program.

DESCRIPTION OF THE RELATED ART

Statically schedulable models of computation do not need prediction because all scheduling decisions are made at compile time; however, they can still take advantage of prefetching state data. Synchronous dataflow (SDF), computation graphs, and cyclo-static dataflow (CSDF) are all powerful models of computation for applications where the schedule is known at compile time. For a valid schedule, it is possible to speed-up the process by simply pre-loading actors and their respective internal state data.

Figure 1:
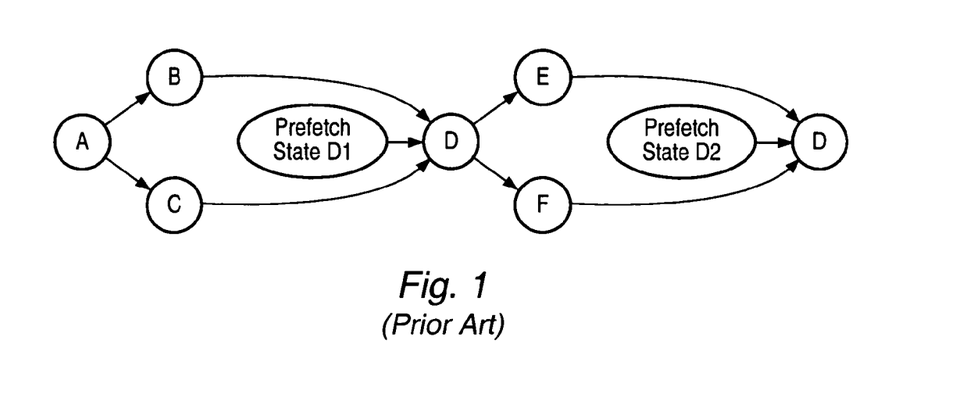
FIG. 1 illustrates a homogeneous synchronous data flow graph that uses prefetching of state information for a shared node D, according to Prior Art.

FIG. 1 (Prior Art)

FIG. 1 shows the prefetch nodes explicitly in the diagram. However, the prefetch nodes could be added implicitly when targeting hardware capable of taking advantage of the parallelism exposed in the dataflow graph.

The idea of prefetching data is not new. Cahoon and McKinley (see B. Cahoon and K. S. McKinley, "*Data Flow Analysis for Software Prefetching, Linked Data Structures in Java,*" in Proceedings of 2001 International Conference on Parallel Architectures and Compilation Techniques, pp. 280-291, 2001) have researched extracting dataflow dependencies from Java applications for the purpose of prefetching state data associated with nodes. Wang et al. (see Z. Wang, T. W. O'Neil, and E. H-M. Sha. "*Optimal Loop Scheduling for Hiding Memory Latency Based on Two-Level Partitioning and Prefetching,*" in IEEE Transactions on Signal Processing, pp. 2853-2864, 2001), when exploring how to best schedule loops expressed as dataflow graphs, also tried to schedule the prefetching of data needed for loop iterations.

Figure 2:
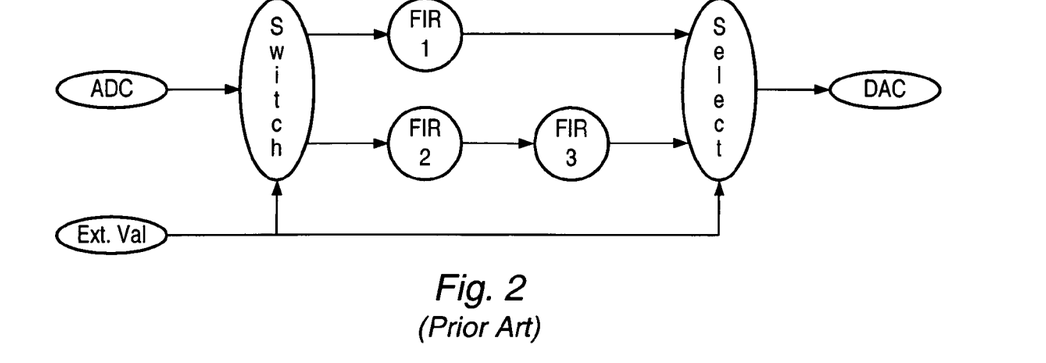
FIG. 2 illustrates a homogeneous and quasi-static Boolean Data Flow graph, according to Prior Art.

FIG. 2 (Prior Art)

FIG. 2 illustrates a homogeneous and quasi-static Boolean Data Flow graph, according to Prior Art. While statically schedulable models of computation are common in signal and image processing applications and make efficient scheduling easier, the range of applications is restrictive because runtime scheduling is not allowed. Dynamically schedulable models of computation, such as Boolean dataflow, dynamic dataflow, and process networks, allow runtime decisions, but in the process make static prefetch difficult, if not impossible. As J. T. Buck explains in his thesis (see J. T. Buck, *Scheduling dynamic dataflow graphs with Bounded Memory Using the Token Flow Model*, PhD Thesis, U. C. Berkeley, 1993), Boolean Dataflow (BDF) is a model of computation sometimes requiring dynamic scheduling. The switch and select actors allow conditional dataflow statements with semantics for control flow as shown in FIG. 2.

Cyclo-dynamic dataflow, or CDDF, as defined by Wauters et al. (see P. Wauters, M. Engels, R. Lauwereins, J. A. Peperstraeta, "*Cyclo-Dynamic Dataflow,*" p. 0319, 4th Euromicro Workshop on Parallel and Distributed Processing (PDP '96), 1996), extends cyclo-static dataflow to allow run-time, data-dependent decisions. Similar to a CSDF, each CDDF actor may execute as a sequence of phases f1, f2, f3, f4, . . . , fn. During each phase fn, a specific code segment may be executed. In other words, the number of tokens produced and consumed by an actor can vary between firings as long as the variations can be expressed in a periodic pattern. CDDF allows run-time decisions for determining the code segment corresponding to a given phase, the token transfer for a given code segment, and the length of the phase firing sequence. The same arguments for using caller prediction for BDF graphs can be extended to include CDDF.

Dynamic dataflow, or DDF, extends the BDF model to allow any Boolean expression to serve as the firing rule. For example, the switch node in FIG. 2 could allow a variable number of tokens on one of its inputs before firing. DDF also allows recursion. DDF requires a run-time scheduler to determine when an actor becomes executable, and is a possible model of computation that could benefit from our prefetch prediction method.

Lee and Parks (see E. A. Lee, and T. M. Parks, "*Dataflow Process Networks,*" Proceedings of the IEEE, pp. 773-801, 1995) describe dataflow process networks as a special case of Kahn process networks. The dataflow process networks implement multiple concurrent processes by using unidirectional FIFO channels for inter-process communication, with non-blocking writes to each channel, and blocking reads from each channel. In the Kahn and MacQueen representation, (see G. Kahn and D. B. MacQueen, "*Coroutines and networks of Parallel Processes,*" Information Processing 77, Gilchrist ed., North-Holland Publishing Co., 1977), run-time configuration of the network is allowed. While some scheduling can be done at compile time, for some applications most actor firings must be scheduled dynamically at run-time.

Figure 3:
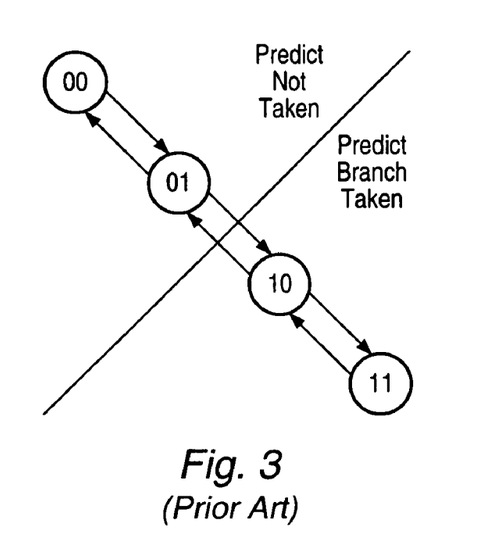
FIG. 3 illustrates a saturating two-bit branch prediction mechanism, according to Prior Art.

FIG. 3 (Prior Art)

Many modern pipelined processors use branch prediction to improve performance by allowing a processor's pipelines to remain full for a greater percentage of the time and by reducing the number of times the pipelines must be flushed because the processor does not know where program execution will be after an instruction. If a processor doesn't know what the next instruction will be, it can't start decoding and executing it. Many methods of branch prediction exist to help the processor predict what the next instruction will be.

One method of branch prediction uses a saturating 2 bit counter that increments whenever a branch is taken and decrements whenever a branch is not taken. The most significant bit of the counter then becomes the prediction of whether a branch will be taken or not.

Figure 4:
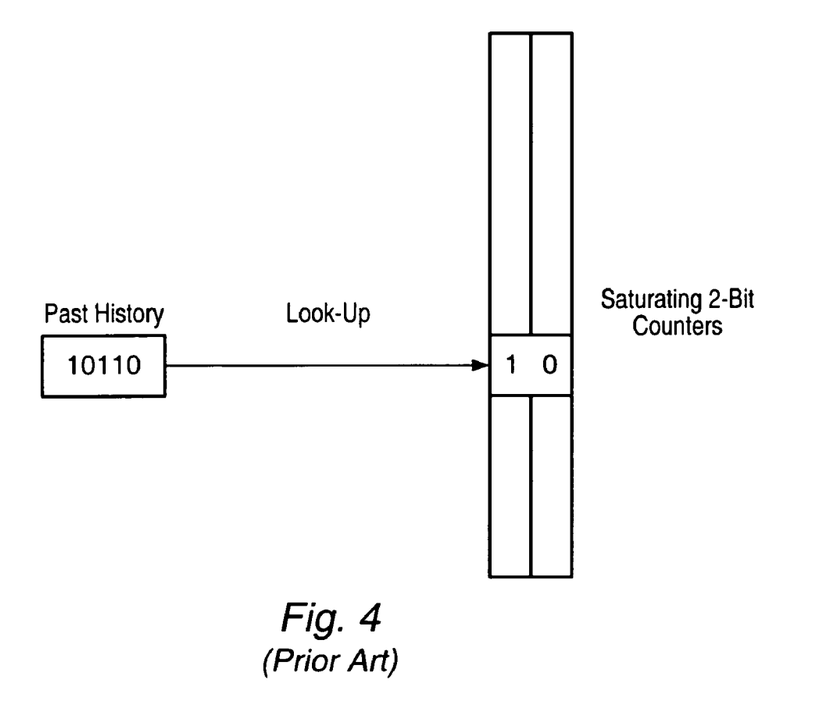
FIG. 4 illustrates a two level branch prediction mechanism, according to Prior Art.

FIG. 4: (Prior Art)

FIG. 4 illustrates two-level branch prediction. A '1' in the counter MSB predicts that a branch will be taken, while a '0' predicts that the branch will not be taken. This approach may achieve a prediction success rate in the 90% range. Patt and Yeh (see T. -Y. Yeh and Y. N. Patt, "*Two-level adaptive training branch prediction,*" in Proceedings of the 24th Annual ACM/IEEE International Symposium on Microarchitecture, pp. 51-61, 1991) have tabulated the hardware costs to be significant for large history lengths.

Two-level branch prediction was pioneered by Patt and Yeh to help keep processor pipelines full for a greater percentage of the time. This prediction model uses a lookup table of saturating two-bit counters that represent the likelihood that a branch will be taken given a certain history. As illustrated below in FIG. 4, the history register consists of data indicating if a branch was taken, or not taken, the past n times. A '1' represents a taken branch, and a '0' represents a branch not taken. The table therefore has $2^n$ entries.

It would be beneficial to have a mechanism for run-time optimization of a dataflow program that includes dynamic constructs.

SUMMARY

A method and system for run-time prediction of a next caller of a shared functional unit for a data flow program is presented. For example, in a multiprocessor system, functional units of an application require different state information depending on the caller of the functional unit. Examples of such functional units include control and filtering applications, among others.

For example, control applications such as PID) loops may require saving a last error and a running integral value as state information associated with a particular caller. A filtering application may require saving previous output values for an IIR filter and/or previous input values for FIR and/or IIR filters. Additionally, different callers may require different filter coefficients. These coefficients could be considered additional state information.

State information is usually saved in memory and may be fetched sequentially every time the functional unit is run. In a multiprocessor system with separate memory banks and caches, the processor running the functional unit may have idle time while other parts of the application are running on different processors. During this dead time, the processor could be fetching the state information from memory into its cache assuming it knows which state information it needs. It could know this by using call prediction and would save all the time necessary to fetch the state information from memory. This could result in a significant speedup. Similar speed up could be achieved for other hardware units capable of parallel execution.

A method for run-time prediction of a next caller of a shared functional unit, wherein the shared functional unit is operable to be called by two or more callers out of a plurality of callers would enable prefetching of state information during the 'dead time'. The shared functional unit and the plurality of callers are operable to execute in parallel on a parallel execution unit. The run-time prediction is used for data flow programs. The run-time prediction can detect a calling pattern of the plurality of callers of the shared functional unit and predict the next caller out of the plurality of callers of the shared functional unit. The run-time prediction then loads state information associated with the next caller out of the plurality of callers.

The shared functional unit and the plurality of callers are operable to execute in parallel on a parallel execution unit. The parallel execution unit includes an FPGA, a programmable hardware element, a reconfigurable logic unit, a non-configurable hardware element, an ASIC, a computer comprising a plurality of processors, and any other computing device capable of executing multiple threads in parallel. In other words, the run-time caller prediction may be implemented on a variety of the parallel execution units that execute data flow programs, such as a multi-processor computing device capable of parallel execution, configurable hardware elements such as FPGAs, and non-configurable hardware elements such as ASICs. The application that executes on the parallel execution device may be programmed in a data flow language such as LabVIEW.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms specific embodiments are shown by way of example in the drawings and will herein be described in detail. It should be understood however, that drawings and detailed description thereto are not intended to limit the invention to the particular form disclosed. But on the contrary the invention is to cover all modifications, equivalents and alternative following within the spirit and scope of the present invention as defined by the appended claims.

DETAILED DESCRIPTION OF THE EMBODIMENTS

Incorporation by Reference

The following U.S. Patents and patent applications are hereby incorporated by reference in their entirety as though fully and completely set forth herein.

U.S. patent application Ser. No. 10/058,150, titled "Reconfigurable Measurement System Utilizing a Programmable Hardware Element and Fixed Hardware Resources" filed Oct. 29, 2001, whose inventors are Brian Keith Odom, Joseph E. Peck, Hugo A. Andrade, Cary Paul Butler, James J. Truchard, Newton Petersen and Matthew Novacek.

U.S. patent application Ser. No. 09/229,695 titled "Reconfigurable Test System" filed on Jan. 13, 1999, whose inventors are Arthur Ryan, Hugo Andrade, and Brian Keith Odom, which is now U.S. Pat. No. 6,322,249.

U.S. patent application Ser. No. 06/312,242 titled "System and Method for Graphically Creating, Deploying and Executing Programs in a Distributed System" filed on Aug. 14, 2001, whose inventors are Jeffrey L. Kodosky, Darshan Shah, and Steven W. Rogers.

U.S. patent application Ser. No. 09/745,023 titled "System and Method for Programmatically Generating a Graphical Program in Response to Program Information," filed Dec. 20, 2000, whose inventors are Ram Kudukoli, Robert Dye, Paul F. Austin, Lothar Wenzel and Jeffrey L. Kodosky.

U.S. patent application Ser. No. 09/595,003 titled "System and Method for Automatically Generating a Graphical Program to Implement a Prototype", filed Jun. 13, 2000, whose inventors are Nicolas Vazquez, Jeffrey L. Kodosky, Ram Kudukoli, Kevin L. Schultz, Dinesh Nair, and Christophe Caltagirone.

U.S. patent application Ser. No. 09/886,455 titled "System and Method for Programmatically Generating a Graphical Program in Response to User Input", filed Jun. 20, 2001, whose inventors are Jeffrey D. Washington, Ram Kudukoli, Robert E. Dye and Paul F. Austin.

U.S. Pat. No. 4,914,568 titled "Graphical System for Modeling a Process and Associated Method," which issued on Apr. 3, 1990, whose inventors are Jeffrey L. Kodosky, James J. Truchard, and John E. MacCrisken.

There are a few characteristics of applications that can take advantage of caller prediction model for prefetching node instance data. In one embodiment, applications should not execute in hard real-time since the prediction logic may be wrong, which may result in jitter. In one embodiment, applications for run-time caller prediction may include applications where quality of service (QoS) can vary depending on how fast the application is running. Buttazzo et al. (see G. Buttazzo and L. Abeni, "*Adaptive Rate Control through Elastic Scheduling*," in *Proceedings of the 39th IEEE Conference on Decision and Control*, pp. 4883-4888, 2000) point out that these applications are common due to the non-deterministic behavior of common low-level processor architecture components, such as caching, prefetching, and direct memory access (DMA) transfers. Buttazzo's work suggests voice sampling, image acquisition, sound generation, data compression, video playback, and certain feedback control systems as application domains that can function at varying QoS depending on the execution rate of the application.

Feedback control systems are particularly interesting because they may contain several subsystems that share common components. Abdelzaher et al. (see T. Abdelzaber, E. M. Atkins, and K. G. Shin, "*QoS Negotiation in Real-Time Systems and Its Application to Automated Flight Control*," in *IEEE Transactions on Computers*, pp. 1170-1183, 2000) explore a complex real-time automated flight control system that negotiates QoS depending on the load of the system. The flight control system consists of a main function that controls the altitude, speed, and bearing of the plane, and also contains subsystems for flight control performance. Continuous analysis of all of the inputs to achieve optimal control is a large computation task. However, the task of flying a plane can be accomplished with relatively little computation power by carefully reserving resources and by tolerating less than optimal control functionality. PID (Proportional-Integral-Derivative) control is a possible compelling application domain because PID tuning parameters are relatively insensitive to rate changes. Many measurement and control applications may display similar properties of varying acceptable QoS.

Figure 5:
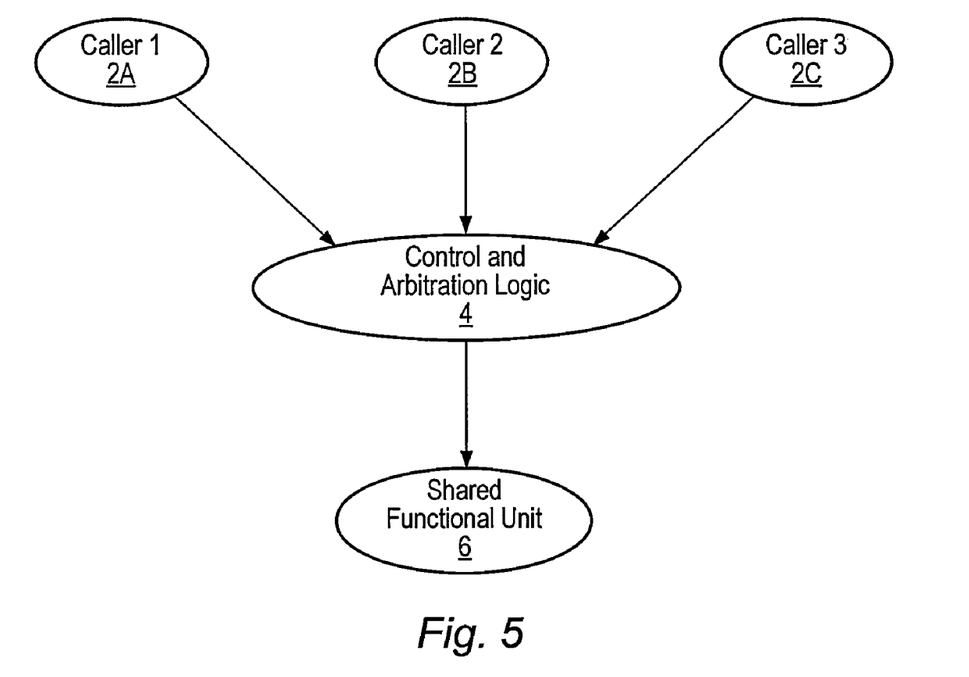
FIG. 5 is a block diagram of a run-time caller prediction mechanism, according to one embodiment.

FIG. 5—Block Diagram of Run-Time Caller Prediction

FIG. 5 illustrates a block diagram of the run-time caller prediction, according to one embodiment. The run-time caller prediction operates to optimize execution of nodes in a data flow program, such as a LabVIEW application described below with reference to FIG. 9.

In one embodiment, the caller prediction consists of two or more callers, such as a first caller 2A, a second caller 2B, and a third caller 2C. A control and arbitration logic unit 4, such as described below with reference to FIGS. 6 and 7, may operate to predict a next caller of a functional unit, such as the shared functional unit 6. The shared functional unit may also be referred to as the shared functional node, such as a node in a data flow program, e.g., a LabVIEW graphical program.

The shared functional unit and the plurality of callers are operable to execute in parallel on a parallel execution unit. In one embodiment, the parallel execution unit includes an FPGA, a programmable hardware element, a reconfigurable logic unit, a nonconfigurable hardware element, an ASIC, a computer comprising a plurality of processors, and any other computing device capable of executing multiple threads in parallel. In other words, the run-time caller prediction may be implemented on a variety of the parallel execution units that execute data flow programs, such as a multi-processor computing device capable of parallel execution, configurable hardware elements such as FPGAs, and non-configurable hardware elements such as ASICs. The application that executes on the parallel execution device may be programmed in a data flow language such as LabVIEW.

For example, for an application with three callers of a shared node, all possible combinations of calls for a history length of 3 are:

0: 111
1: 112
2: 113
3: 121
4: 122
5: 123
6: 131
7: 132
8: 133
9: 211
10: 212
11: 213
12: 221
13: 222
14: 223
15: 231
16: 232
17: 233
18: 311
19: 312
20: 313
21: 321
22: 322
23: 323
24: 331
25: 332
26: 333

It is noted that FIG. 5 is exemplary only, and the units may have various architectures or forms, as desired.

Figure 6:
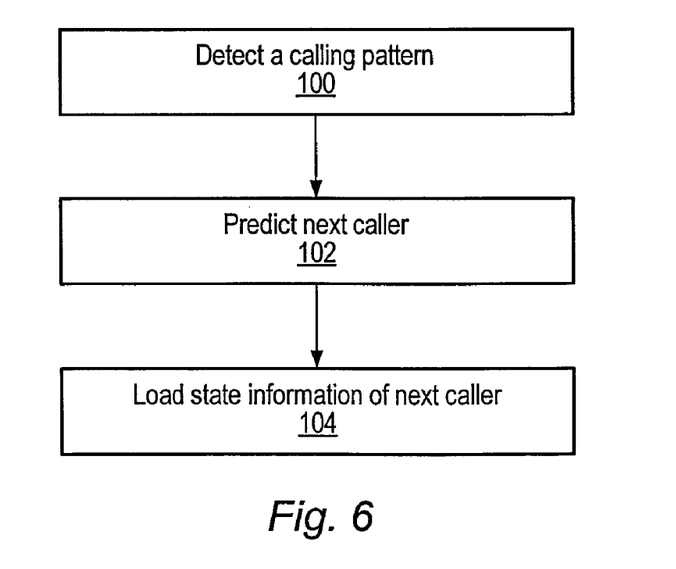
FIG. 6 is a flowchart diagram illustrating a run-time caller prediction, according to one embodiment.

FIG. 6—Flowchart of Run-Time Caller Prediction Algorithm

FIG. 6 is a flowchart of the run-time caller prediction algorithm, according to one embodiment. The run-time caller prediction algorithm may predict a next caller of a node in a data flow program, such as a next caller of a node 32 in a LabVIEW graphical program described below with reference to FIG. 9.

In 100, the control and arbitration logic may detect a calling pattern of the plurality of callers of the shared functional unit, according to one embodiment. In other words, the control and arbitration logic may examine a past history of callers of the shared functional unit 6, and detect a calling pattern. In one embodiment, the detection may operate in a manner similar to one described below with reference to FIG. 7. In another embodiment, the detection may operate in a manner similar to one described below with reference to FIG. 8.

In 102, the control and arbitration logic may predict a next caller of the shared functional unit 6. In other words, the control and arbitration logic may predict the next caller out of the plurality of callers, such as the next caller out of the three callers 2A, 2B, and 2C described above with reference to FIG. 5. In one embodiment, the prediction may operate in a manner similar to one described below with reference to FIG. 7. In another embodiment, the prediction may operate in a manner similar to one described below with reference to FIG. 8.

In 104, the control and arbitration logic may load state information associated with the next caller out of the plurality of callers. In other words, the control and arbitration logic may load the state information for the next caller out of the plurality of callers, such as the next caller out of the three callers 2A, 2B, and 2C described above with reference to FIG. 5. The state information may include execution state, values of any variable, any previous inputs, any previous outputs, and any other information related to execution of a node in a dataflow diagram.

In some embodiments, a memory medium may include instructions to generate a program to perform run-time call prediction of a next caller of a shared functional unit. In one embodiment, the program may operate to generate the shared functional unit and the plurality of callers from the dataflow graph on the parallel execution unit prior to detecting of 100. In other words, the units used in the data flow program as well as the prediction logic may be generated and deployed on a parallel execution unit.

The program may execute on a computer and the program may be intended for deployment on parallel execution unit. In one embodiment, the program may generate a shared functional unit and the plurality of callers from the dataflow graph on the parallel execution unit. For example, in one embodiment the program may include program instructions for a multi-processor computing device capable of parallel execution. In another embodiment, the program may include digital logic for configurable hardware elements such as FPGAs. In yet another embodiment, the program may hardware descriptions for non-configurable hardware elements such as ASICs.

It is noted that the flowchart of FIG. 6 is exemplary only. Further, various steps in the flowchart of FIG. 6 may occur concurrently or in a different order than that shown, or may not be performed, as desired. Also, various additional steps may be performed as desired.

Figure 7:
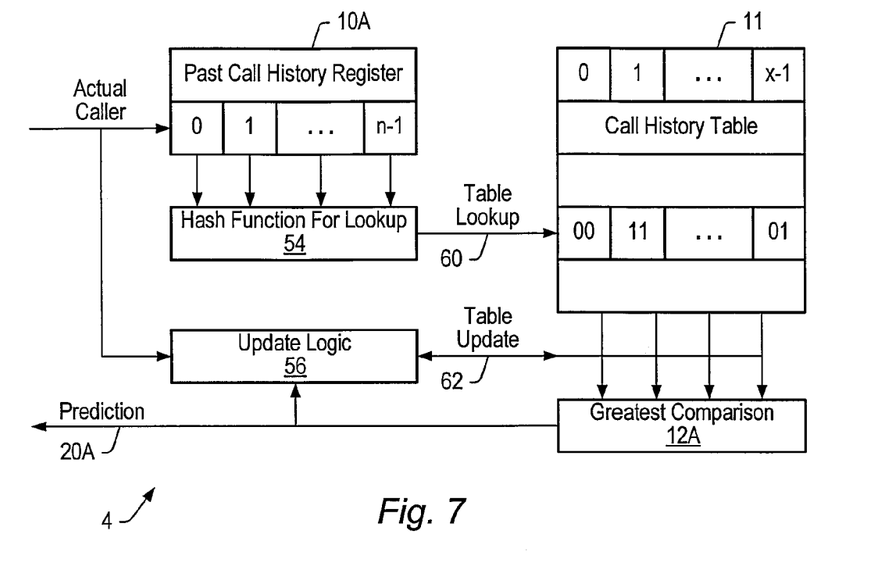
FIG. 7 illustrates a two level caller prediction mechanism, according to one embodiment.

FIG. 7—Two Level Caller Prediction

FIG. 7 illustrates a block diagram of a two level caller prediction mechanism, according to one embodiment. This design of the prediction mechanism may be similar to the two-level branch prediction mechanism described above with reference to FIG. 4. FIG. 7 shows the overall block diagram architecture. In the following example, each caller has an exemplary unique identification, i.e., is numbered from 1-9. Other unique identifications for the callers can be used as desired.

In one embodiment, a past call history register 10A, such as a shift register, may keep track of the last n calls to a shared node, such as the shared node 6 described above with reference to FIG. 5. In one embodiment, the values held in the call history register 10A may be connected directly to a hash function 54 that may convert the history entry to a row lookup index into the call history table 11. In one embodiment, the call history table 11 may have a column for each possible caller of the shared node. In other embodiments, the call history table 11 may use a reduced and optimized numbed of columns for the callers of the shared node.

In one embodiment, each cell in the call history table 11 may be managed by update logic 56 that may operate to increment, i.e., use table update 62, when a prediction 20A is correct and decrement when a prediction 20A is incorrect. For example, in order to generate a prediction 20A, the column values across the call history table 11 may be compared (12A) to find the greatest value.

In one embodiment, there may be a row in the call history table 11 for each possible value of the call history register 10A. However, the number of rows may grow exponentially ($x^n$) with the length of the call history register 10A. For three callers (x) and a history length of eight (n), the direct map approach may require 6561 rows. In one embodiment, a hashing function 54A may be used to eliminate the exponential dependence, i.e., to perform a table lookup 60. In other embodiments, other algorithms may be used that minimize the number of rows in the call history table 10A.

In the above prediction model, the maximum number of callers may be analogous to a numeric base, and each position in the call history shift register 10A may be analogous to a position in the numeric base. For example, for ten possible callers, a call history register 10A containing 9,6,2 maps to a lookup index of 962 using base 10. For 11 possible callers, a conversion may be performed by evaluating $9*11^2+6*11^1+2*11^0$. In one embodiment, a hardware modulo hash function may be used to convert and multiply the running sum by a large prime number during each stage. The hardware modulo hash function may only use the lower k bits of the direct mapped result. Hashing introduces collisions, which decrease the prediction accuracy.

For the three caller example described above with reference to FIG. 5, each combination may be converted into an index. For a small history length, this could be a direct conversion as shown in the example above, but for longer lengths, a hashing function may be used to keep the table sizes reasonable. For example, a history index may be used as a lookup into a table of saturating counters for each caller:

TABLE 1

Past history lookup table for shared component callers

| | Caller 1 | Caller 2 | Caller 3 |
|---|---|---|---|
| 0 | 01 | 11 | 01 |
| 1 | 10 | 00 | 00 |
| 2 | 01 | 10 | 11 |
| 3 | 11 | 01 | 00 |
| . | . | . | . |
| . | . | . | . |
| . | . | . | . |
| 15 | 01 | 10 | 00 |
| . | . | . | . |
| . | . | . | . |
| . | . | . | . |
| 26 | 11 | 01 | 10 |

In one embodiment, after the table lookup, the call prediction may become the counter with the largest value. For example, for if a history of past callers is 231, then the index may become 15 and the call prediction may predict the caller 2 as the next caller. In one embodiment, the table may be updated if the call prediction was correct.

In one embodiment, if the application quickly settles to a periodic schedule and the schedule changes infrequently, the need to keep track of past periodic behavior may be eliminated.

It is noted that FIG. 7 is exemplary only, and the various elements in this Figure may have various architectures or forms, as desired. Further, various blocks in the block diagram of FIG. 7 may be included in a different order than that shown, or may not be included, as desired. Also, various additional blocks may be included as desired.

Figure 8:
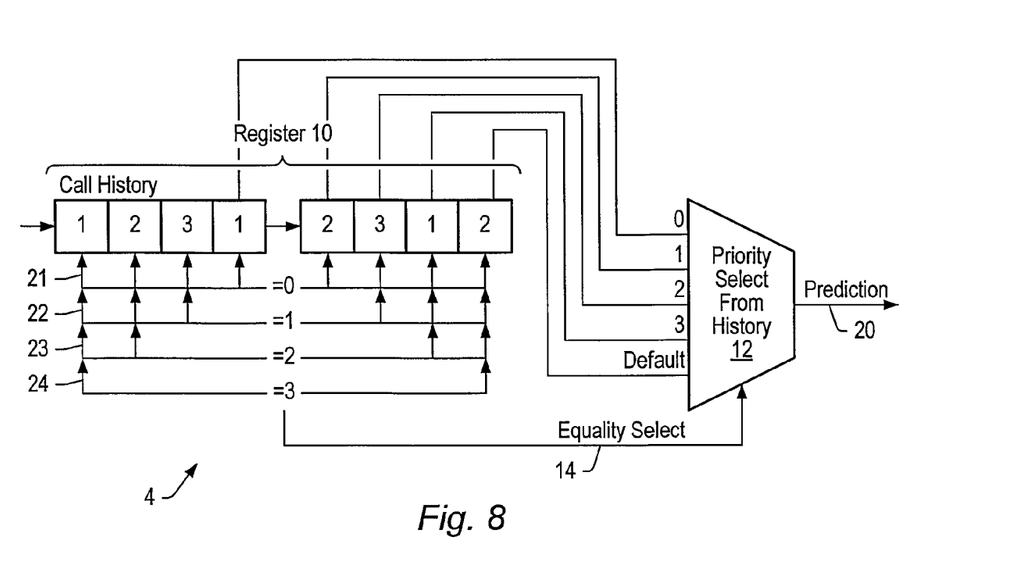
FIG. 8 illustrates a periodic caller prediction mechanism, according to one embodiment.

FIG. 8—Periodic Caller Prediction

FIG. 8 illustrates a block diagram of a run-time periodic caller prediction mechanism, according to one embodiment.

In one embodiment, FIG. 8 illustrates a predictor model that determines the current periodic behavior in the current calling history. The following explanation uses call history that holds eight past callers. Note that call history size is exemplary only and other smaller and larger call history sizes can be used as desired.

In one embodiment, the periodic caller prediction may include a call history register 10 that contains a previous call history of a shared functional unit, such as the shared node described above with reference to FIG. 5. In one embodiment, the call history register 10 may be updated in a manner similar to that of a shift register. In other embodiments the call history register 10 may be updated using other techniques as known in the art. In yet another embodiment, the call history may be stored in other devices such as logic cells, memory devices, and other hardware and/or software units designed to store and retrieve data.

In one embodiment, the call history register 10 in the period predictor is similar to the past history register of the two-level predictor. In one embodiment, the call history may be divided in two parts that are substantially equal to each other. In one embodiment, comparisons 21, 22, 23, and 24 may operate to find the section of the second half of the call history that best correlates with the section of the first half. This operates to compare the callers of the first portion of the caller history to the callers of the second portion of the caller history. In one embodiment, each of the plurality of callers may have a unique identification, where the unique identification of each of the callers is used in the call history in order to identify a periodic portion of the caller history. In other embodiments other methods may be used to identify the periodic portion of the caller history.

In one embodiment, a multiplexer may be used to select an element from the call history register 10. For example, the comparisons 21, 22, 23, and 24 may operate to indicate an Equality Select 14 that may operate as an input to the multiplexer 12. The multiplexer 12 may then select an element from the call history register 10 depending on the selection input 14 from the comparisons 21, 22, 23, and 24. Other embodiments of comparing and selecting are contemplated, such as various digital logic functions and/or instructions.

For example, for a past call history of 12341234, the first equality is true, and the periodic caller prediction may select 4 as the prediction 20. Similarly, for a history of 02345602, the third equality is true, and periodic caller prediction may select 6 as the prediction 20. These comparisons assume that the period of the calling sequence is contained in the call history register 10, and that call prediction latency is equal to the length of the call history register 10 if the period or the calling sequence changes.

It is noted that FIG. 8 is exemplary only, and the various elements in this Figure may have various architectures or forms, as desired. Further, various blocks in the block diagram of FIG. 8 may be included in a different order than that shown, or may not be included, as desired. Also, various additional blocks may be included as desired.

Figure 9:
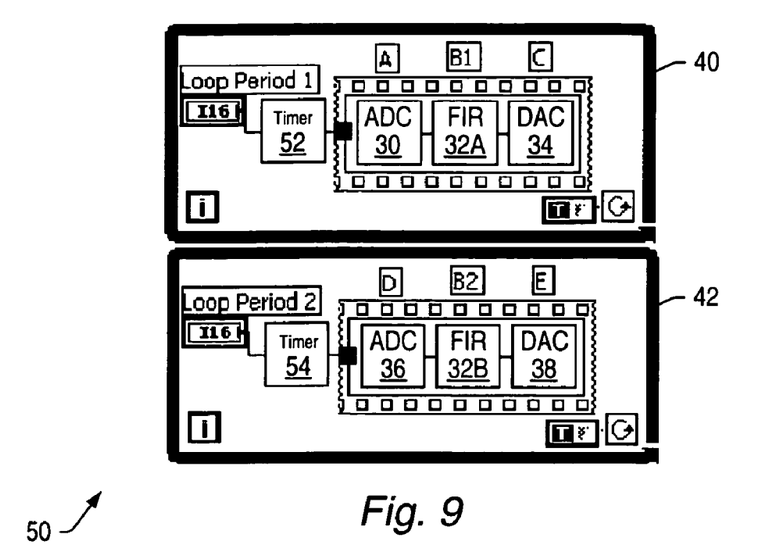
FIG. 9 illustrates exemplary LabVIEW VIs for testing an exemplary periodic caller prediction, according to one embodiment.

FIG. 9—Exemplary LabVIEW Filtering Application

FIG. 9 illustrates an exemplary LabVIEW filtering application to test an exemplary predictor model. The exemplary LabVIEW application 50 consists of two loops 40 and 42, where each loop contains an FIR filtering function. Each loop has an ADC 30 and 36, an FIR 32A and 32B, and a DAC 34 and 28. The ADC 30 and 36 is an Analog-to-Digital Converter that is operable to acquire analog data, convert it to digital data, and supply the digital data to the FIR filter 32A and 32B. The exemplary LabVIEW application is a data flow program that may execute on any of the parallel execution units that execute data flow programs as described above with reference to FIG. 5. In one embodiment, the shared functional unit and the plurality of callers are generated from a dataflow program.

The FIR 32A and 32B may be the shared node on the parallel execution unit that may be shared by two callers—the first ADC 30 in the first loop 40 and the second ADC 36 in the second loop 42. In other words, the two separate FIR nodes 32A and 32B in the LabVIEW block diagram correspond to the same shared FIR block.

The timer blocks 52 and 54 may provide the dynamic sample rate for the ADCs 36 and 38 and for the DACs 34 and 38 on the two independent channels. The sample rate may also determine which set of coefficients may be loaded into the FIR block 32A and 32B for filtering.

In one embodiment, previous inputs to the FIR filters 32A and 32B may be stored locally. The previous inputs may be dependent on the caller and thus should be saved as state information. Because each loop may be running at a different rate, the next caller of the shared node, e.g., the FIR filter node 32 may not be known. If the prediction is wrong, then state information would need to be reloaded in other words, the worst case should not slow down the execution of the above system, and the best case speeds up the execution.

Figure 10:
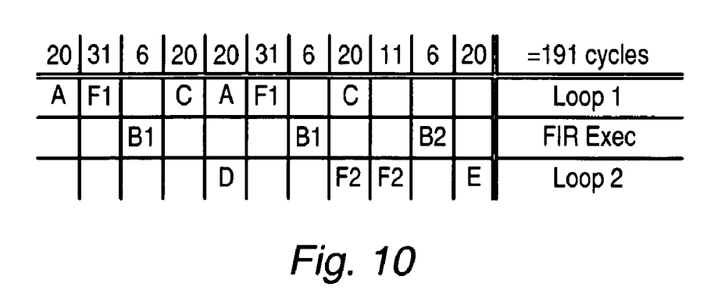
FIG. 10 is a table of exemplary execution times of the exemplary LabVIEW VIs without using the periodic caller prediction, according to one embodiment.

FIG. 10—Table for Execution Times Without Using Periodic Predictor

Figure 11:
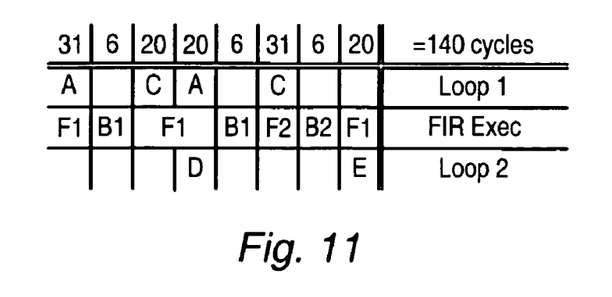
FIG. 11 is a table of exemplary execution times of the exemplary LabVIEW VIs using the periodic caller prediction, according to one embodiment.

FIG. 11 illustrates a table with exemplary execution times for the exemplary LabVIEW filtering application using an exemplary shared FIR block without using the periodic predictor, according to one embodiment.

In the exemplary analysis below, the first ADC 30 (block A) the second ADC 36 (block D) the first DAC (block C) and the second DAC (block E) each take 20 cycles to execute. Fetching the coefficients and current tap values (blocks F1 and F2) take 31 cycles each, and execution of the shared FIR filter block 32A and 32B (the shared node) (blocks B1 and B2) takes 6 cycles.

FIG. 10 illustrates a schedule with three parallel threads of execution without prefetch prediction. In this exemplary analysis, the first loop 40 executes twice as fast as the second loop 42.

The top row of the table shows the execution time of each block, the second row shows the execution of blocks in loop 1, the third row shows when the shared FIR block executes, and the last row shows the execution of blocks in loop 2. In one embodiment, fetching may occur inline with the loop executions since it is not known which loop will call the FIR block next.

FIG. 11—Table for Execution Times Using Periodic Predictor

FIG. 11 illustrates a table with exemplary execution times for the exemplary LabVIEW filtering application using an exemplary shared FIR block using the periodic predictor, according to one embodiment.

In this example, the periodic prediction may prefetch data for the next caller while other blocks execute, as shown in FIG. 9. In one embodiment, the above application may have a 33% improvement with correct predictions. In one embodiment, for a period prediction unit with a history register long enough to contain the entire period, the predictions may be correct. If the predictions are incorrect, the sampling schedule may shift, and the sampling rate would vary. Note that these results are exemplary only for a simple exemplary application and may vary depending on the implementation of the run-time prediction mechanism, the type of a data flow program, the number and size of shared nodes, and other factors as described above.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A method for run-time prediction of a next caller of a shared functional unit, wherein the shared functional unit is operable to be called by two or more callers out of a plurality of callers, the method comprising:
   storing a caller history of the shared functional unit;
   detecting a calling pattern of the plurality of callers of the shared functional unit, wherein said detecting comprises:
      dividing the caller history into a first portion of the caller history and a second portion of the caller history, wherein the first portion and the second portion each hold an equal amount of the caller history; and
      comparing the callers in the first portion of the caller history to the callers in the second portion of the caller history;
   predicting the next caller out of the plurality of callers of the shared functional unit; and
   loading state information associated with the next caller out of the plurality of callers;
   wherein the shared functional unit and the plurality of callers are operable to execute in parallel on a parallel execution unit.

2. The method of claim 1, wherein the run-time prediction is performed for an application described by a dataflow graph.

3. The method of claim 1, wherein the mn-time prediction is performed for an application programmed in a dataflow language.

4. The method of claim 1, wherein said storing the caller history uses a history register, wherein the history register is operable to be divided into two equal portions.

5. The method of claim 4, wherein said comparing operates to compare callers in the first portion part of the history register to the callers in the second portion of the history register.

6. The method of claim 4, wherein, each of the plurality of callers has a unique identification wherein the unique identification is operable to be used in the caller history.

7. The method of claim 6, wherein the history register is operable to store the unique identification of each of the two or more callers calling the shared functional unit by operating analogously to a shift register.

8. The method of claim 6, wherein said comparing the callers comprises comparing the unique identifications of the callers in the first portion of the caller history to the unique identifications of the callers in the second portion of the caller history.

9. The method of claim 1, wherein said comparing the callers in the first portion of the caller history to the callers in the second portion of the caller history operates to select a periodic portion of the caller history.

10. The method of claim 9, further comprising:
    using a multiplexer to said predict the next caller of the shared functional unit after selecting the periodic portion of the caller history.

11. The method of claim 1, wherein the parallel execution unit comprises one or more of
    an FPGA;
    a programmable hardware element:
    a reconfigurable logic unit;
    a nonconfigurable hardware element;
    an ASIC;
    a computer comprising a plurality of processors; or
    any other computing device capable of executing multiple threads in parallel.

12. The method of claim 1, wherein the state information comprises one or more of:
    execution state;
    values of any variable;
    previous inputs;
    previous outputs; or
    any other information related to execution of a node in a dataflow diagram.

13. The method of claim 1, wherein a dataflow program comprises a plurality of nodes, wherein the plurality of nodes comprises the shared functional unit, wherein the plurality of nodes further comprises the plurality of callers,
    wherein the run-time prediction operates to optimize execution of the plurality of nodes in the dataflow program.

14. The method of claim 13, wherein the shred functional unit and the plurality of callers are generated using the dataflow program.

15. A method for run-time call prediction for resolving resource contention between two or more callers of a shared node in a dataflow program, the method comprising:
    storing a caller history of the shared node;
    detecting a calling pattern by a plurality of callers of the shared node, wherein said detecting comprises:
       dividing the caller history into a first portion of the caller history and a second portion of the caller history, wherein the first portion and the second portion each hold an equal amount of the caller history; and
       comparing the callers in the first portion of the caller history to the caller in the second portion of the caller history;
    predicting a next caller out of the plurality of callers of the shared node; and
    loading state information associated with the next caller out of the plurality of callers;
    wherein the shared node and the plurality of callers are operable to execute in parallel on a parallel execution unit.

16. The method of claim 15, wherein the dataflow program comprises a plurality of nodes, wherein the plurality of nodes comprises the shared node, wherein the plurality of nodes further comprises the plurality of callers.

17. The method of claim 16,
wherein the run-time call prediction operates to optimize execution of the plurality of nodes in the dataflow program.

18. The method of claim 15,
wherein the dataflow program executes on the parallel execution unit wherein the parallel execution unit comprises one or more of
an FPGA;
a programmable hardware element;
a reconfigurable logic unit;
a nonconfigurable hardware element;
an ASIC;
a computer comprising a plurality of processors; or
any other computing device capable of executing multiple threads in parallel.

19. The method of claim 15,
wherein each of the plurality of callers has a unique identification, wherein the unique identification is operable to be used in the caller history.

20. The method of claim 19,
wherein the caller history is operable to store the unique identification of each of the two or more callers calling the shared node by operating analogously to a shift register.

21. The method of claim 19,
wherein said comparing the callers comprises comparing the unique identifications of the callers in the first portion of the caller history to the unique identifications of the callers in the second portion of the caller history.

22. The method of claim 15,
wherein said comparing the callers in the first portion of the caller history to the callers in the second portion of the caller history operates to select a periodic portion of the caller history.

23. The method of claim 15,
wherein the stared node and the plurality of callers are generated by the dataflow program.

24. A memory medium comprising instructions to generate a program to perform run-time call prediction of a next caller of a shared functional unit, wherein the program is intended for deployment on a parallel execution unit, wherein the program is executable to:
store a caller history of the shared functional unit;
detect a calling pattern of a plurality of callers of the shared functional unit, wherein the shared functional unit is operable to be called by two or more callers out of the plurality of callers, wherein said detecting comprises:
dividing the caller history into a first portion of the caller history and a second portion of the caller history, wherein the first portion and the second portion are each operable to hold an equal amount of the caller history; and
comparing the callers in the first portion of the caller history to the callers in the second portion of the caller history;
predict the next caller out of the plurality of callers of the shared functional unit; and
load state information associated with the next caller out of the plurality of callers;
wherein the shared functional unit and the plurality of callers are operable to execute in parallel on the parallel execution unit.

25. The memory medium of claim 24,
wherein a dataflow program comprises a plurality of nodes, wherein the plurality of nodes comprises the shared functional unit, wherein the plurality of nodes further comprises the plurality of callers,
wherein the run-time call prediction operates to optimize execution of the plurality of nodes in the dataflow program.

26. The memory medium of claim 24,
wherein the program executes on the parallel execution unit, wherein the parallel execution unit comprises one or more of:
an FPGA;
a programmable hardware element;
a reconfigurable logic unit;
a nonconfigurable hardware element;
an ASIC;
a computer comprising a plurality of processors; or
any other computing device capable of executing multiple threads in parallel.

27. The memory medium of claim 24,
wherein said storing th e caller history comprises storing the caller history in a history register;
wherein said comparing operates to compare callers in the first portion of the history register to the callers in the second portion of the history register;
wherein each of the plurality of callers has a unique identification.

28. The memory medium of claim 27,
wherein the history register is operable to store the unique identification of each of the two or more callers calling the shared functional unit by operating analogously to a shift register.

29. The memory medium of claim 27,
wherein said comparing the callers comprises comparing the unique identifications of the callers in the first portion of the caller history to the unique identifications of the callers in the second portion of the caller history.

30. The memory medium of claim 24,
wherein said comparing the callers in the first portion of the caller history to the callers in the second portion of the caller history operates to select a periodic portion of the caller history.

31. The memory medium of claim 24,
wherein the program comprises one or more of:
program instructions;
digital logic; or
any type of hardware description used to configure the parallel execution unit.

32. The memory medium of claim 24,
wherein the shared functional unit and the plurality of callers are generated by the program.

33. The memory medium of claim 24,
wherein the program comprises a control and arbitration logic unit that is operable to said detect, said predict, and said load.

34. A system for run-time optimization of a dataflow program, the system comprising:
a parallel execution unit;
a plurality of callers;
a shared functional unit, wherein the shared functional unit is operable to be called by two or more callers out of the plurality of callers, wherein the shared functional unit and the plurality of callers are operable to execute in parallel on the parallel execution unit;

an optimization algorithm, wherein the optimization algorithm is operable to:
  store a caller history of the shared functional unit;
  detect a calling pattern of the plurality of callers of the shared functional unit, wherein said detecting comprises:
    dividing the caller history into a first portion of the caller history and a second portion of the caller history, wherein the first portion and the second portion are each operable to hold an equal amount of the caller history; and
    comparing the callers in the first portion of the caller history to the caller in the second portion of the caller history;
  predict a next caller out of the plurality of callers of the shared functional unit; and
  allocate state information associated with the next caller out of the plurality of callers.

35. The system of claim 34,
wherein the parallel execution unit comprises one or more of:
  an FPGA;
  a programmable hardware element;
  a reconfigurable logic unit;
  a nonconfigurable hardware element;
  an ASIC;
  a computer comprising a plurality of processors; or
  any other computing device capable of executing multiple threads in parallel.

36. The system of claim 34,
wherein said storing the caller history comprises storing the caller history in a history register;
  wherein said comparing operates to compare callers in the first portion of the history register to the callers in the second portion of the history register;
wherein each of the plurality of callers has a unique identification.

37. The system of claim 36,
wherein the history register is operable to store the unique identification of each of the two or more callers calling the shared functional unit by operating analogously to a shift register.

38. The system of claim 36,
wherein said comparing the callers comprises comparing the unique identifications of the callers in the first portion of the caller history to the unique identifications of the callers in the second portion of the caller history.

39. The system of claim 34,
wherein said comparing the callers in the first portion of the caller history to the callers in the second portion of the caller history operates to select a periodic portion of the caller history.

40. The system of claim 34,
wherein the shared functional unit and the plurality of callers are generated using the dataflow program.

41. The system of claim 34,
wherein the optimization algorithm is implemented on a control and arbitration logic unit that is operable to said detect, said predict, and said allocate.

* * * * *

UNITED STATES PATENT AND TRADEMARK OFFICE
CERTIFICATE OF CORRECTION

| | |
|---|---|
| PATENT NO. | : 7,426,628 B2 |
| APPLICATION NO. | : 10/800829 |
| DATED | : September 16, 2008 |
| INVENTOR(S) | : Petersen |

It is certified that error appears in the above-identified patent and that said Letters Patent is hereby corrected as shown below:

In the Claims:

Column 11
Line 48, please delete "the mn-time prediction" and substitute -- the run-time prediction --.

Column 14
Line 22, please delete "storing th e caller" and substitute -- storing the caller --.

Signed and Sealed this

Eleventh Day of November, 2008

JON W. DUDAS
*Director of the United States Patent and Trademark Office*